United States Patent Office 3,773,822
Patented Nov. 20, 1973

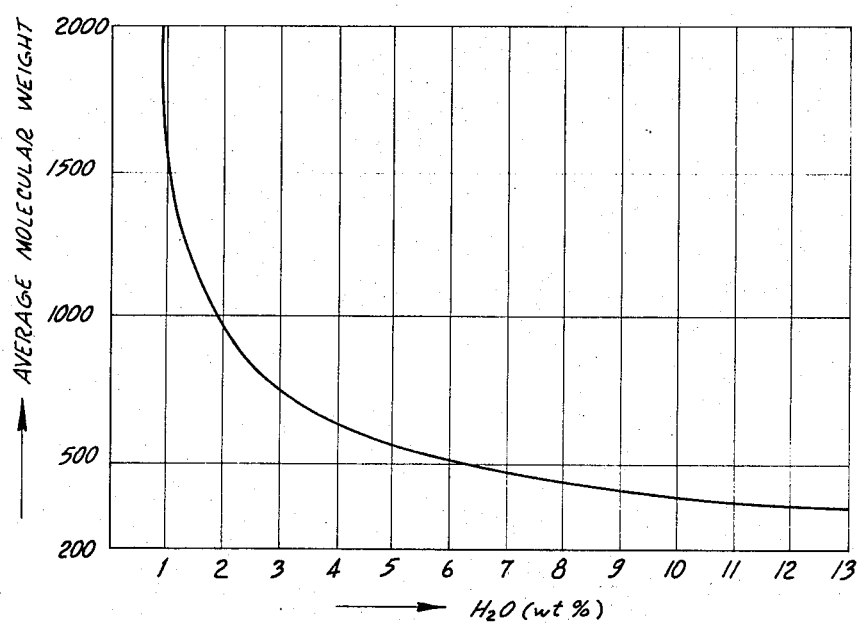

3,773,822
PROCESS OF MAKING POLYESTER POLYOLS
Erich Bäder, Hanau am Main, and Lothar Rohe, Wuppertal-Vohwinkel, Germany, assignors to Deutsche Gold- und Silber-Scheideanstalt vormals Roessler, Frankfurt am Main, Germany
Filed Nov. 5, 1970, Ser. No. 87,052
Claims priority, application Germany, Nov. 6, 1969, P 19 55 841.9
Int. Cl. C07c 69/66
U.S. Cl. 260—484 A          10 Claims

ABSTRACT OF THE DISCLOSURE

Polyester polyols are made by subjecting a lactone of the formula

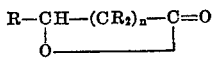

in which R is hydrogen or alkyl of 1–4 carbon atoms and $n$ is an integer from 4 to 5, to polymerization in the presence of water in an amount between about 0.03 and 1.0 mole for each mole of lactone at a temperature between about 50 and 300° C. whereby the lactone ring is opened and an ω-hydroxy polyester carboxylic acid of an average molecular weight between about 300 and 3000 is formed whereupon the acid is reacted with a lower alkylene oxide to form the polyester polyol.

The polyols find use as the polyol component in the manufacture of polyurethanes, as softeners, as lubricating agents and in connection with the lacquer and resin manufacture in general.

CROSS-REFERENCES TO RELATED APPLICATIONS

A further process for making polyester polyols is disclosed and claimed in an application filed by the same inventors concurrently herewith Ser. No. 87,352 (based on German application P 19 55 848.6/44).

BACKGROUND OF THE INVENTION

Polyester polyols have been made previously by polymerizing lactones with compounds, particularly organic compounds, adapted to open up the lactone ring. Initiators for this ring-opening step are usually compounds that have at least one hydroxyl or amino group. The polymerization is effected at a temperature between 50 and 300° C. and preferably in the presence of a catalyst; see German published application 1,217,019.

A shortcoming of this process is that the lactone employed as starting product must be anhydrous since otherwise the acid number of the polymer is too high.

The invention therefore has the object to form polyester polyols in a process which avoids this drawback. More generally, the invention has the object to form polyester polyols with predetermined molecular weights and terminal hydroxyl groups.

SUMMARY OF THE INVENTION

These objects are met by subjecting a lactone of the formula

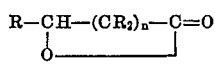

in which R is hydrogen or alkyl of 1–4 carbon atoms and $n$ is an integer from 4 to 5 to polymerization in the presence of water in an amount between about 0.03 and 1.0 mole for each mole of lactone at a temperature between about 50 and 300° C. In this step the lactone ring is opened and a ω-hydroxy polyester carboxylic acid is produced which has an average molecular weight between about 300 and 3000. This acid is then reacted with a lower alkylene oxide to form the polyester polyol. The acid may be isolated prior to the final reaction step.

The novel features which are considered as characteristic for the invention are set forth in particular in the appended claims. The invention, in its fundamental relationships, will be best understood from the following description of specific embodiments when read in connection with the accompanying drawing.

BRIEF DESCRIPTION OF THE DRAWING

The drawing shows the relationship between the average molecular weight of the product obtained and the amount of water employed in the reaction.

DETAILED DESCRIPTION OF THE INVENTION AND OF PREFERRED EMBODIMENTS

Preferably, the polymerization is carried out in the presence of a catalyst. An elevated pressure may be used. The preferred range of water is between 0.1 and 0.5 mole per mole of lactone.

The ω-hydroxy polyester carboxylic acid may be isolated prior to the reaction with the lower alkylene oxide.

The average molecular weight of the ω-hydroxy polyester carboxylic acid can be adjusted as desired, depending upon the amount of water, within the range of about 300 and about 3000.

In order to effect this adjustment the theoretical amount of water is necessary for the particular molecular weight, if this is above about 1000. For molecular weights below 1000, the amounts of water, however, must be larger than the theoretical amounts, that is the excess must be higher when the desired average molecular weight should be smaller. For instance, if the molecular weight is desired to be 350, 0.94 mole of water must be used per mole of lactone.

If polycaprolactones are desired with a molecular weight below 1000, it is preferred to remove the excess water by heating in a vacuum.

The relation of average molecular weight and amount of water employed is shown in the drawing for a reaction temperature of 170° C. within the pressure range of 15 atm. above atmospheric pressure. Intermediate values can be easily ascertained by interpolation.

The polymerization in the presence of water proceeds rather slowly if no catalyst is used. It is therefore preferable to add a hydrolysis-resistant catalyst. Examples are alkali- and earth alkali hydroxides, as well as alkali- and earth alkali carbonates, acids, manganese acetate, lead acetate and zinc borate, as well as, preferably, reesterification catalysts such as titanates, organic tin compounds such as for instance dibutyl tin oxide, and most preferably zirconates such as zirconium octoate, or mixtures of these catalysts. The catalysts are employed in the conventional amounts between 0.05 and 0.5 wt.-percent relative to the ε-caprolactone.

In the first stage of the operation, ω-hydroxy polyester carboxylic acids are obtained which are liquid or up to wax-like, partly solid substances which are colorless or faintly yellow-colored. They are highly soluble in conventional organic solvents, particularly acetone.

The ω-hydroxy polyester carboxylic acid is then reacted in the second stage of the process with lower alkylene oxides, which term is intended to imply alkylene oxides having from 1 to 6 carbon atoms. There are thus obtained the corresponding polyester polyols with terminal hydroxyl groups.

This reaction with the alkylene oxides can be effected, tor instance, by placing the ω-hydroxy polyester carboxylic acid in an autoclave and heating it to a temperature between about 100 and 300° C. whereupon the alkylene oxide is pumped into the autoclave. The reaction is then permitted to proceed for a certain time, for instance for several hours. It is preferred to carry out this reaction in the presence of a catalyst, since in this manner complete reaction may be obtained. As catalysts all of the above-named catalysts can again be used in this step. However, it is preferred to employ alkoxylation catalysts. Examples of these are particularly tertiary amines and organic zirconium- and titanium compounds. The catalysts are again used in the conventional amount between 0.05 and 0.5 wt.-percent relative to the ε-caprolactone.

The alkylene oxides can be used in equimolar amounts. In order to obtain as complete a reaction as possible, it is however preferable to employ an excess of alkylene oxide. The molar excess may be up to 600%. In that case, it is also possible to obtain a complete reaction without using an alkoxylation catalyst.

It is furthermore preferred to carry out the reaction under a protective gas, for instance of nitrogen or a noble gas in order to avoid oxidative discolorations. The starting products may be ε-caprolactone or a methyl-substituted ε-caprolactone. The preferred starting product is ε-caprolactone.

Examples for the lower, that is the 1–6 carbon atoms containing alkylene oxides are ethylene oxide, propylene oxide, 1,2-butylene oxide, epichlorhydrin or glycidyl ether.

As compared with prior-art procedures for making polyester polyols, the process of the invention has the advantage that no polyol is necessary as a starting product. Since the polyol was formed from an alkylene oxide and water in the presence of a catalyst, this procedure required the subsequent removal of the catalyst. The process of the invention therefore constitutes a simplification.

The polyester polyols of the invention can be used as the polyol components in making polyurethanes. They are useful also as softeners and lubricating agents and in general for lacquer and resin manufacture.

Both reactions, the polymerization and the alkoxylation of the terminal carboxylic acid group can be carried out in a continuous manner.

The following examples will further illustrate and explain the invention.

Example 1

991 g. of ε-caprolactone, 9 g. of water, and 0.5 g. of dibutyl tin oxide were placed in an autoclave which was flushed with nitrogen. 15 atm. above atmospheric pressure nitrogen was applied, and the contents were heated for 40 minutes to 170° C. There was thus obtained a faintly yellow product of an acid number of 28.1 mg. KOH/g. of material and having a molecular weight of 1995.

With a catalyst mixture of 0.5% dibutyl tin oxide and 0.2% zirconium octonate, the polymerization was effected in 30 minutes.

To 1000 g. of the polycaprolactone, 88 g. of ethylene oxide were added, and the mass was heated under an atmosphere of 25 atm. above atmospheric pressure of nitrogen for a time of 2.5 hours to a temperature of 170° C.

The residual monomers were then removed in a vacuum at 170° C.

The final product obtained had an acid number of 0.2 mg. KOH/g. of product and had an OH number of 55.2 mg. KOH/g. of product. The molecular weight of the final product was 2020.

Example 2

982 g. of ε-caprolactone, 18 g. of water and 2.0 g. zirconium octoate were heated under an atmosphere of 15 atm. above atmospheric of nitrogen to a temperature of 170° C. in a time of 1.5 hours. The product obtained was yellow-colored. Its acid number was 55 mg. KOH/g. and the molecular weight was 1020.

1000 g. of the thus-obtained polycaprolactone was heated with 145 g. of propylene oxide under an atmosphere of 15 atm. above atmospheric pressure of nitrogen to a temperature of 170° C. in a time of 3 hours. The residual monomers were subsequently removed in a vacuum at 170° C.

The final product had an acid number of 0.3 mg. KOH/g. and an OH number of 111 mg. KOH/g. Its molecular weight was 1010.

If, prior to the reaction with the alkylene oxide, 0.2% diamine were added, only 72 g. propylene oxide were necessary in order to obtain complete propoxylation within 1 hour.

Example 3

930 g. of ε-caprolactone, 70 g. of water and 0.5 g. of dibutyl tin oxide were heated to 170° C. during a time of 40 minutes under an atmosphere of 50 atm. above atmospheric pressure of nitrogen. The excess water was removed at 140° C. and a vacuum of 10–15 mm. Hg. The product was colored yellow. Its acid number was 115 mg. KOH/g. and its molecular weight was 487.

487 g. of the thus-obtained polycaprolactone, 176 g. of ethylene oxide, and 1 g. of zirconium octoate were then heated for a period of three hours to 170° C. in an atmosphere of 25 atm. above atmospheric of nitrogen. The residual monomers were subsequently removed in a vacuum at 170° C. The final product had a yellow color. Its acid number was 0.2 mg. KOH/g. and its OH number was 206.8 mg. KOH/g. Its molecular weight was 542.

Example 4

This example illustrates how different polycaprolactones with predetermined molecular weights can be obtained by reacting ε-caprolactone with water in specific weight ratios. In all cases the mixture was heated, after adding 0.2% zirconium octoate or 0.1% dibutyl tin oxide, to 170° C. for a time of 40 minutes in an atmosphere of 15 atm. above atmospheric pressure of nitrogen. The thus-obtained polycaprolactone could be reacted with the epoxides without prior isolation.

The amounts of water and the resulting molecular weights appear from the following table.

| Added water (wt. percent): | Molecular weight of the polycaprolactone |
| --- | --- |
| 13 | 347 |
| 8 | 450 |
| 7 | 487 |
| 6 | 550 |
| 3.6 | 648 |
| 4.55 | 596 |
| 2.4 | 826 |
| 1.8 | 1035 |
| 1.44 | 1213 |
| 1.2 | 1370 |
| 0.9 | 1995 |

Without further analysis, the foregoing will so fully reveal the gist of the present invention that others can by applying current knowledge readily adapt it for various applications without omitting features that from the standpoint of prior art fairly constitute essential features of the generic or specific aspects of this invention and, therefore, such adaptations should and are intended to be comprehended within the meaning and range of equivalence of the appended claims.

What is claimed as new and desired to be protected by Letters Patent is set forth in the appended claims.

We claim:

1. The process of making polyester polyols comprising subjecting a lactone of the formula

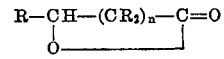

in which R is hydrogen or alkyl of 1–4 carbon atoms and n is an integer from 4 to 5, to polymerization in the presence of water in an amount between about 0.03 and 1.0 mole for each mole of lactone at a temperature between about 50 and 300° C. and in the presence of dibutyl tin oxide, zirconium octoate or a mixture of these two compounds as polymerization catalyst whereby the lactone ring is opened and an ω-hydroxy polyester carboxylic acid of an average molecular weight between about 300 and 3000 is formed whereupon the acid is reacted with a lower alkylene oxide to form the polyester polyol.

2. The process of claim 1, wherein the polymerization is effected upon application of pressure.

3. The process of claim 1, wherein the ω-hydroxy polyester carboxylic acid obtained as the intermediate product is not isolated prior to the reaction with the alkylene oxide.

4. The process of claim 1, wherein the ω-hydroxy polyester carboxylic acid obtained as the intermediate product is isolated prior to the reaction with the alkylene oxide.

5. The process of claim 1, wherein the lactone employed as starting product is ε-caprolactone.

6. The process of claim 1, wherein the alkylene oxide is ethylene oxide, propylene oxide, 1,2-butylene oxide, epichlorohydrin or glycidyl ether.

7. The process of claim 1, wherein the reaction with the alkylene oxide is carried out in the presence of a catalyst.

8. The process of claim 7, wherein the catalyst is an organic zirconium compound, an organic titanium compound or a mixture of these compounds.

9. The process of claim 8, wherein the catalyst is zirconium octoate.

10. The process of claim 1, wherein an excess of alkylene oxide is employed.

References Cited

UNITED STATES PATENTS

| | | | |
|---|---|---|---|
| 2,962,455 | 11/1960 | Hostettler et al. | 260—2.5 |
| 2,975,149 | 3/1961 | Port | 260—23 |

LORRAINE A. WEINBERGER, Primary Examiner

P. J. KILLOS, Assistant Examiner

U.S. Cl. X.R.

252—56 S; 260—78.3 R